(12) United States Patent
Carter et al.

(10) Patent No.: US 7,822,701 B2
(45) Date of Patent: Oct. 26, 2010

(54) LEXICON GENERATION METHODS, LEXICON GENERATION DEVICES, AND LEXICON GENERATION ARTICLES OF MANUFACTURE

(75) Inventors: Richard J. Carter, Richland, WA (US); Jonathon D. McCall, West Richland, WA (US); Paul D. Whitney, Richland, WA (US); Michelle L. Gregory, Richland, WA (US); Alan E. Turner, Kennewick, WA (US); Elizabeth G. Hetzler, Kennewick, WA (US); Amanda M. White, Kennewick, WA (US); Christian Posse, Seattle, WA (US); Grant C. Nakamura, Kennewick, WA (US)

(73) Assignee: Battelle Memorial Institute, Richland, WA (US)

(*) Notice: Subject to any disclaimer, the term of this patent is extended or adjusted under 35 U.S.C. 154(b) by 756 days.

(21) Appl. No.: 11/479,522

(22) Filed: Jun. 30, 2006

(65) Prior Publication Data
US 2008/0005051 A1  Jan. 3, 2008

(51) Int. Cl.
*G06N 7/00* (2006.01)
(52) U.S. Cl. ...................................... 706/55
(58) Field of Classification Search ............ 706/55
See application file for complete search history.

(56) References Cited

OTHER PUBLICATIONS

Turney et al ("Measuring Praise and Criticism: Inference of Semantic Orientation from Association" 2003).*
Esuli et al ("Determining the Semantic Orientation of Terms through Gloss Classification" CIKM'05, pp. 617-624, Oct. 31-Nov. 5, 2005).*
"Linguistic Inquiry and word Count"; Pennebaker et al.; LIWC2001; 2001; 23 pp.
"Recognizing Contextual Polarity in Phrase-Level Sentiment Analysis"; Wilson et al.; 2005; 8 pp.
"Learning Subjective Adjectives from Corpora"; Janyce M. Wiebe; American Association for Artificial Intelligence; 2000; 6 pp.
"A Bootstrapping Method for Learning Semantic Lexicons Using Extraction Pattern Contexts"; Thelen et al.; EMNLP; 2002; 8 pp.
"A Sentimental Education: Sentiment Analysis Using Subjectivity Summarization Based on Minimum Cuts"; Pang et al.; Proc. of the ACL; 2004; 8 pp.
"Mining Opinion Features in Customer Reviews"; Hu et al.; Proc. of 19th National Conference on Artificial Intelligence; 2004; 6 pp.
"Customizing Sentiment Classifiers to New Domains: a Case Study"; Aue et al.; Microsoft Research; 2005; 7 pp.

(Continued)

*Primary Examiner*—Donald Sparks
*Assistant Examiner*—Lut Wong
(74) *Attorney, Agent, or Firm*—Wells St. John, P.S.

(57) ABSTRACT

Lexicon generation methods, computer implemented lexicon editing methods, lexicon generation devices, lexicon editors, and articles of manufacture are described according to some aspects. In one aspect, a lexicon generation method includes providing a seed vector indicative of occurrences of a plurality of seed terms within a plurality of text items, providing a plurality of content vectors indicative of occurrences of respective ones of a plurality of content terms within the text items, comparing individual ones of the content vectors with respect to the seed vector, and responsive to the comparing, selecting at least one of the content terms as a term of a lexicon usable in sentiment analysis of text.

33 Claims, 7 Drawing Sheets

|  | $Doc_1$ | $Doc_2$ | $Doc_3$ | $Doc_4$ |
|---|---|---|---|---|
| $Seed_{1-n}$ | 8 | 8 | 1 | 1 |
| $Content_1$ | 2 | 1 | 0 | 1 |
| $Content_2$ | 0 | 1 | 0 | 1 |
| $Content_3$ | 0 | 0 | 1 | 0 |
| $Content_4$ | 5 | 0 | 1 | 0 |

OTHER PUBLICATIONS

"Measuring Praise and Criticism: Inference of Semantic Orientation from Association"; Turney et al.; CNRC; 2003; 39 pp.

"Creating Subjective and Objective Sentence Classifiers from Unannotated Texts"; Wiebe et al.; CICLing-05; 2005; 12 pp.

"Indexing by Latent Semantic Analysis"; Deerwester et al.; Journal of the Society for Information Science; 1990; 34 pp.

"Conductive chat: Instant Messaging With a Skin Conductivity Channel"; DiMicco et al; Proc. of Conf. on Computer Supported Work; 2002; 2 pp.

"Comparing Partitions With Spie Charts"; Dror G. Feitelson; Technical Report; 2003; pp. 1-2.

"Beating Some Common Sense Into Interactive Applications"; Lieberman et al.; American Association for Artificial Intelligence; 2003; 6 pp.

"Visualizing the Affective Structure of a Text Document"; Liu et al.; Computer Human Interaction; Apr. 5-10, 2003; 2 pp.

"Interactive Poster: faMailiar—Intimacy-based Email Visualization"; Mandic et al.; Proc. of IEEE Conference on Information Visualization; 2004; 2 pp.

"Exploring Attitude and Affect in Text: Theories and Applications"; www.clairvoyancecorp.com/Research/Workshops/AAAI-EAAT-2004,html; Mar. 2004; 4 pp.

"Communicating Emotions in Online Chat Using Physiological Sensors and Animated Text"; Wang et al.; CHI-04; Apr. 24-29, 2004; 4 pp.

"Analysis Experiences Using Information Visualization"; Hetzler et al.; IEEE Computer Graphics and Applications; 2004; 22 pp.

"Visualising Human Dialog"; Tat et al.; Proc. of IEEE Conference on Information; 2002; 6 pp.

"Learning Dictionaries for Information Extraction by MultiLevel Bootstrapping"; Riloff et al.; Proc. of 16th Nat'l Conf on AI; 1999; 17 pp.

Exploring the Parameters for Creating a Sentiment Lexicon; Gregory et al.; Jun. 8, 2006; 4 p.

* cited by examiner

THE PRESIDENT: Thanks for the warm welcome, Thank you all. Thanks very much. It's great to be back in the capital of Ohio. I have spent some quality time here. (Laughter and applause.) I have a history in Columbus my grandfather, Prescott Bush, was raised right here. And down the road, my maternal grandfather, Marvin Pierce, was raised in Dayton, Ohio. I had to bring that up, otherwise Mother would call me. (Laughter.)

I appreciate many of the great qualities of Columbus, Ohio. I appreciate the fact that you take your sports seriously. (Laughter.) You've got the mighty Buckeye football team. (applause.) Understand there's going to be an interesting inter-state next September the 11th--mighty Longhorns will be coming up, make sure you treat them as hospitably as you treated me. (Applause.) Looks like the basketball team can play pretty well. (Applause.)

Axes:
☑ Positive
☑ Negative
☐ Pleasure
☐ Pain
☐ Virtue
☐ Vice
☐ PowCoop
☐ PowCon
☐ PosAff
☐ NegAff Paste Text    Refresh    Close

FIG. 9

LEXICON GENERATION METHODS, LEXICON GENERATION DEVICES, AND LEXICON GENERATION ARTICLES OF MANUFACTURE

GOVERNMENT RIGHTS STATEMENT

This invention was made with Government support under Contract DE-AC05-76RL01830 awarded by the U.S. Department of Energy. The Government has certain rights in the invention.

TECHNICAL FIELD

This invention relates to lexicon generation methods, computer implemented lexicon editing methods, lexicon generation devices, lexicon editors, and articles of manufacture.

BACKGROUND

Sentiment analysis is a task of classifying documents into emotive categories, such as positive or negative. Corporations have used conventional sentiment analysis to track public opinion, employee attitude, and customer satisfaction with products of the corporations. Following general methodologies of information retrieval, there are two predominant methods for identifying sentiment or affect in documents and include text classification models and lexical approaches. Conventional classification models may utilize documents which are hand labeled for affect or sentiment, and a system may be trained using the labels. Some conventional classification models may utilize a relatively large amount of training data and may be relatively domain dependent. Some conventional lexical approaches may be susceptible to contextual variability of sentiment in plural domains or incomplete coverage of lexicons.

At least some aspects of the disclosure are directed towards improved apparatus and methods with respect to aspects of sentiment or affect analysis.

SUMMARY OF THE INVENTION

According to one aspect of the disclosure, a lexicon generation method comprises providing a seed vector indicative of occurrences of a plurality of seed terms within a plurality of text items, providing a plurality of content vectors indicative of occurrences of respective ones of a plurality of content terms within the text items, comparing individual ones of the content vectors with respect to the seed vector, and responsive to the comparing, selecting at least one of the content terms as a term of a lexicon usable in sentiment analysis of text.

According to another aspect of the disclosure, a lexicon generation method comprises providing a plurality of first values corresponding to occurrences of a plurality of seed terms within a plurality of text items, providing a plurality of second values corresponding to occurrences of a plurality of content terms within the text items, comparing the first values and the second values using an L1 distribution density measure, and responsive to the comparing, selecting at least one of the content terms as a term of a lexicon usable in sentiment analysis of text.

According to still another aspect of the disclosure, a computer implemented lexicon editing method comprises displaying a lexicon comprising a plurality of terms using a graphical user interface, displaying a user interactive element of the graphical user interface during the displaying the lexicon, accessing user input associated with the user interactive element, processing the user input, and performing an operation with respect to the lexicon responsive to the processing.

According to another additional aspect of the disclosure, a sentiment lexicon generation device comprises processing circuitry configured to access a seed list comprising a plurality of seed terms, first analyze a plurality of text items individually comprising a plurality of content terms, the analysis providing a plurality of first values corresponding to respective ones of the text items, and wherein individual ones of the first values are indicative of a number of occurrences of the seed terms within respective ones of the text items, for individual ones of the content terms, determine a plurality of second values individually indicative of a number of occurrences of the respective content term in one of the text items, for individual ones of the content terms, second analyze the second values of the respective content term with respect to the first values, and select at least one of the content terms for inclusion within a lexicon usable in sentiment analysis of text responsive to the second analysis.

According to an additional aspect of the disclosure, a lexicon editor comprises a display configured to depict visual images and processing circuitry coupled with the display and configured to control the display to depict a graphical user interface to assist a user with interaction of a lexicon usable in sentiment analysis of text, the processing circuitry being configured to control the graphical user interface to depict a plurality of terms of the lexicon and a user interactive element, and wherein the processing circuitry is configured to implement at least one operation with respect to the lexicon responsive to user access of the user interactive element.

According to yet another aspect of the disclosure, an article of manufacture comprises media comprising programming configured to cause processing circuitry to perform processing comprising accessing a plurality of seed terms of a seed list, providing a plurality of first values indicative of occurrences of any of the seed terms in respective ones of a plurality of text items, comparing the first values with a plurality of second values which are indicative of occurrences of a content term within respective ones of the text items, and selecting the content term as a term of a lexicon usable in sentiment analysis of text responsive to the comparing.

According to still another aspect, an article of manufacture comprises media comprising programming configured to cause processing circuitry to perform processing comprising controlling a display of a lexicon usable in sentiment analysis of text and comprising a plurality of terms within a graphical user interface, controlling a display of a user interactive element of the graphical user interface during the displaying of the lexicon, accessing user input associated with the user interactive element, and performing at least one operation with respect to the lexicon responsive to the accessing.

BRIEF DESCRIPTION OF THE DRAWINGS

Embodiments of the invention are described below with reference to the following accompanying drawings.

DETAILED DESCRIPTION

At least some aspects of the disclosure pertain to apparatus and methods with respect to affect analysis, also referred to as sentiment analysis, of text. Affect or sentiment analysis of text pertains to classifying text into a plurality of emotive or sentiment categories (e.g., positive, negative, pleasure, pain, virtue, vice, power cooperative, power conflict, positive affirmation and negative affirmation). Once classified as to affective content, the text may be further processed or analyzed in one embodiment. As discussed in some exemplary embodiments below, some aspects are directed towards generating and modifying sentiment lexicons, also referred to as affect lexicons, which may be used in sentiment analyses of text. A lexicon usable in sentiment analysis is an association between words or phrases and a sentiment category corresponding to the lexicon. In more specific examples, some exemplary aspects are directed towards defining sentiment lexicons which may be used to analyze text while other aspects are directed towards facilitating user interaction and manipulation of sentiment lexicons.

Figure 1:
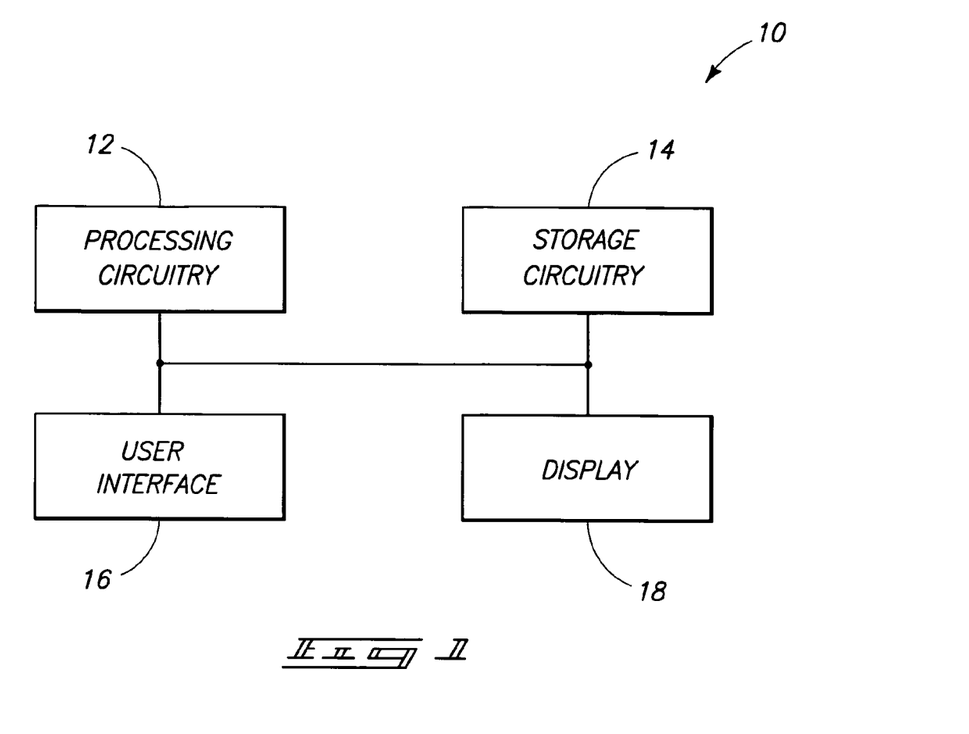
FIG. 1 is a functional block diagram of a computing device according to one embodiment.

Referring to FIG. 1, an exemplary computing device is illustrated with respect to reference 10. In the depicted embodiment, computing device 10 may be arranged as a workstation (e.g., Unix), personal computer, or other suitable computing arrangement. In the depicted embodiment, computing device 10 includes processing circuitry 12, storage circuitry 14, a user interface 16 and a display 18. Other configurations comprising more, less and/or alternative components or circuits are possible.

In one embodiment, processing circuitry 12 is arranged to process data, control data access and storage, issue commands, and control other desired operations. Processing circuitry 12 may comprise circuitry configured to implement desired programming provided by appropriate media in at least one embodiment. For example, the processing circuitry 12 may be implemented as one or more of a processor and/or other structure configured to execute executable instructions including, for example, software and/or firmware instructions, and/or hardware circuitry. Exemplary embodiments of processing circuitry 12 include hardware logic, PGA, FPGA, ASIC, state machines, and/or other structures alone or in combination with a processor. These examples of processing circuitry 12 are for illustration and other configurations are possible.

The storage circuitry 14 is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 12 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 14 described above and/or communicated via a network or other transmission media and configured to control appropriate processing circuitry 12. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

User interface 16 is configured to interact with a user including receiving inputs from the user (e.g., tactile input, voice instruction, etc.). User interface 16 may be implemented as one or more of a keyboard, mouse and/or other input device in illustrative examples. Any other suitable apparatus for interacting with a user may also be utilized.

Display 18 is configured to generate and depict images to convey data to a user. Display 18 may be configured as a cathode ray tube monitor or LCD monitor in a few examples. Display 18 may also depict graphical user interfaces (GUIs) in some embodiments to facilitate user interaction with computing device 10.

Computing device 10 is arranged to perform some of the disclosed aspects with respect to textual affect or sentiment analysis. In one embodiment, computing device 10 is configured to operate upon a corpus including a plurality of text items. Text items individually comprise a plurality of content terms (e.g., lemmas, words or other sequences of meaning bearing symbols) and examples of text items may include documents, correspondence, phrases, sentences, or chunks of text in but one implementation.

Computing device 10 may be configured to generate and/or modify sentiment lexicons which may be used in sentiment analysis in one embodiment. A plurality of different sentiment lexicons may be generated for different emotions which may also be referred to as axes. In one embodiment, a plurality of different sentiment lexicons may be provided and analysis of text may be performed with respect to the following exemplary different emotions or axes: positive (excluding "yes" in one embodiment), negative (excluding "no" and "any" in one embodiment), pleasure (indicating enjoyment of a feeling, including words indicating confidence, interest and commitment in one embodiment), pain (indicating suffering, lack of confidence, or lack of commitment in one embodiment), virtue (indicating moral approval or good fortune in one embodiment), vice (indicating moral disapproval or misfortune in one embodiment), power cooperative (indicating ways of cooperating in one embodiment), power conflict (indicating ways of conflicting in one embodiment), positive affirmation (indicating positive feelings, acceptance, appreciation and emotional support in one embodiment), and negative affirmation (indicating negative feelings and emotional rejection in one embodiment). Other types of emotive content or axes may be analyzed in other embodiments.

In one exemplary sentiment lexicon generation embodiment, computing device 10 may access a plurality of seed lists corresponding to the respective axes for which the sentiment lexicons will be generated. Seed lists may individually include a plurality of seed terms which may be affect bearing words which assist with identifying sentiment or affect of text items. The seed terms may be defined by a user or otherwise provided. Affect bearing words, also referred to as affective words, convey the mood or sentiment in a text item. For example, the phrases "she is thrifty" and "she is cheap" convey the same information with different emotions of positive in the former and negative in the latter. In this illustrative example, "thrifty" and "cheap" are affect bearing words. In one embodiment described further below, seed lists of ten seed terms have provided suitable results. Seed lists including additional numbers of seed terms may be used in other embodiments. In illustrative examples, a seed list for a positive axis may be: BONUS, CHARISMA, FAIR, FLOURISH, FUN, GREAT, HAPPY, LIKE, NURTURE, and POSITIVE; and a seed list for a negative axis may be: AGGRESSIVE, BAD, DISASTER, FILTH, FURIOUS, HATE, HORRIBLE, IGNORANT, NEGATIVE, and TERRIBLE.

Computing device 10 may perform bootstrapping which generates and/or expands a sentiment lexicon for a desired axis using a respective seed list corresponding to the axis as well as a corpus of text items. In one embodiment, the bootstrapping identifies one or more content terms of text items which may be added to the sentiment lexicon being generated for subsequent use in classification of text items into emotive or affect categories. Content terms are lemmas or words appearing in the text items in one embodiment. Computing device 10 attempts to identify suitable content terms as affect bearing words which may be added to a sentiment lexicon and used to indicate or measure sentiment, emotional tone or affect of textual items.

Figure 2:
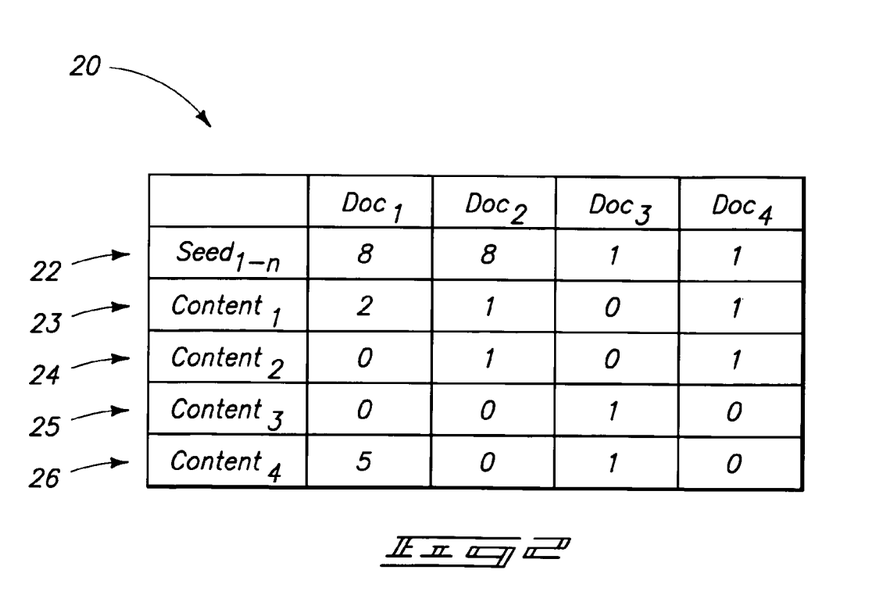
FIG. 2 is a matrix of a plurality of terms with respect to a plurality of text items according to one embodiment.

Referring to FIG. 2, an exemplary method which may be performed by computing device 10 is described with respect to a matrix 20. Computing device 10 may access a corpus of a plurality of text items to generate matrix 20 in one embodiment. In the illustrated exemplary embodiment of FIG. 2, the text items are indicated as documents 1-4 arranged corresponding to columns of matrix 20. More or less text items may be present in other embodiments. In one embodiment, computing device 10 may also access terms for analysis with respect to the text items. In FIG. 2, the terms include seed terms and content terms arranged corresponding to the rows of matrix 20. The seed terms 1-n of row 22 may include all of the seed terms of the seed list selected corresponding to the axes for which the sentiment lexicon is being generated and combined to form a composite seed list including terms 1-n. The content terms of rows 23-26 correspond to text content of the text items being analyzed. For example, computing device 10 may process the text items of the corpus in one arrangement to identify a list of all content terms (e.g., words or lemmas) which are present or occur in the text items. Accordingly, in typical examples, far more content terms may be included in matrix 20. In one embodiment, the list of content terms may be referred to as a vocabulary of content terms occurring in the corpus being analyzed.

Thereafter, the text items of the corpus individually receive an affect score by counting the number of occurrences of seed terms from the seed list or lexicon that occur in the respective text item. Also, the number of occurrences of individual ones of the content terms are determined for the respective text items. Thereafter, content terms in the corpus may be scored for affect potential by comparing their distribution of occurrence over the set of text items to the distribution of affect bearing words over the set of text items. Content terms that compare favorably with affect are given consideration as affect bearing words to be added to the respective lexicon.

In a more specific example, computing device 10 may generate values for each of the cells of the matrix. With respect to the composite seed list of row 22, the computing device 10 may provide values for row 22 according to the number of occurrences of any of the seed terms of the composite seed list present within the respective text items 1-4 (e.g., 8 occurrences of all of the seed terms of the composite seed list were counted for document 1, 8 for document 2, 1 for document 3 and 1 for document 4 in the depicted example). In one embodiment, row 22 may be a seed vector (e.g., a single vector comprising values indicative of the number of occurrences of the seed terms within respective ones of the text items). An individual value of the seed vector is indicative of the total number of occurrences of all seed terms of the composite seed list within the respect text item in one embodiment. Computing device 10 may also provide values for the cells of remaining rows 23-26 indicative of a number of occurrences of the respective content terms 1-4 present in respective ones of the text items. Rows 23-26 may be in the form of content vectors where individual ones of the vectors include the values corresponding to the number of occurrences of the respective content term in the respective text items. The values of matrix 20 may be determined by computing device 10 or pre-calculated or otherwise accessed by computing device 10 in other embodiments.

Processing circuitry 12 may use the seed and content vectors in an attempt to identify content terms for inclusion in a lexicon. For example, computing device 10 may compare the seed vector with individual ones of content vectors in an attempt to determine whether the content terms carry the same or similar affect or emotion as the composite list of seed terms. Responsive to the comparison, processing circuitry 12 may identify and select content terms as affect bearing terms for inclusion into the sentiment lexicon being generated.

Combining the seed terms into a composite seed list provides advantages of computational efficiency compared with some conventional methods. For example, some conventional methods operate to compare each seed term with respect to each content term occurring in a corpus. In the exemplary above-described embodiment of the disclosure, the single seed vector indicative of the occurrences of all of the seed terms in the text items is compared with the individual content vectors. Accordingly, if the seed list has ten terms, the exemplary method described above performs computations with respect to a single comparison of the single seed vector with respect to one of the content vectors as opposed to ten comparisons of each individual seed term with each content term. The efficiency results in one embodiment from boiling down an affect score for words or terms in an affect lexicon to an overall score of a text item.

In other embodiments of the disclosure, a plurality of seed vectors are generated for respective ones of the individual seed terms and the seed vectors may be individually compared with individual ones of the content vectors in order to identify additional content terms as affect bearing terms.

Different methods may be used to analyze the vectors in an attempt to compare a candidate word in the corpus (content term) with the affect or sentiment of the lexicon being generated. In one example, an L1 distribution density measure may be used to measure similarity between term occurrence and affect (e.g., compare the seed vector with respective ones of the term vectors). Let $d_i$ denote a current affect score for an $i^{th}$ document corresponding to the vector of row 22 (FIG. 2) and let $w_i$ denote the occurrence of the candidate words in the $i^{th}$ document corresponding to the respective vectors of rows 23-26 being compared (the subscripts are dropped when referring to the overall vectors). The vectors d and w, when normalized, form probability distributions over the corpus. In one embodiment, the normalization constraints are respectively $$\sum d_i \text{ and } \sum w_i.$$

For clarity, let $D_i=d_i/\Sigma d_j$ and $W_i=w_i/\Sigma w_j$ denote the normalized document spectra (corresponding to the vector of one of rows 23-26) and word occurrence vector (corresponding to the vector of row 22), respectively. A L1 distribution density measure may be used to measure the distances between vector 22 and one of the vectors 23-26 and may be calculated as:

$$\Sigma|D_i-W_i|/2. \qquad \text{Eqn. 1}$$

The distance may also be written as:

$$1-\Sigma\min(W_i, D_i) \qquad \text{Eqn. 2}$$

The L1 distribution density measure has the interpretation that w and d are related if this measure is small. A small score of this quantity suggests that the word corresponding with w is carrying the affect associated with d.

In other embodiments, other distance measures may be used. For example, correlation, Chi-square or dominance scoring methods may be used in the other embodiments.

Following the analysis of the vectors 23-26 individually with respect to vector 22, the content terms associated with vectors 23-26 which have the greatest similarity to the affect of the seed terms are selected as affect bearing terms of the sentiment lexicon being generated in one embodiment. In some embodiments, a desired number of content terms (e.g., 20, 50, 100 or more) having the smallest associated values of the exemplary L1 processing may be selected. In one embodiment, the selected content terms are candidates and a user may determine which of the content terms having the smallest associated values are entered into the lexicon by entering appropriate user input.

After generation of the sentiment lexicon for the desired sentiment axes, the computing device 10 may generate another sentiment lexicon for another of the desired sentiment axes. In one example, a seed list of seed terms corresponding to another different sentiment may be selected and analyzed with respect to a corpus of text items to bootstrap or add terms to generate another respective sentiment lexicon.

Computing device 10 may also operate as a lexicon editor which performs at least one operation with respect to one or more lexicon. In illustrative examples discussed below, computing device 10 may perform operations to assist a user with analysis of a lexicon, searching terms in a lexicon, adding affect bearing terms to a lexicon, comparing lexicons of different sentiment axes, and as a text item viewer. Lexicons may include sentiment lexicons or lexicons useable for other text processing purposes (e.g., lexicons used to classify text as medical, legal or other types of text).

Figure 3:
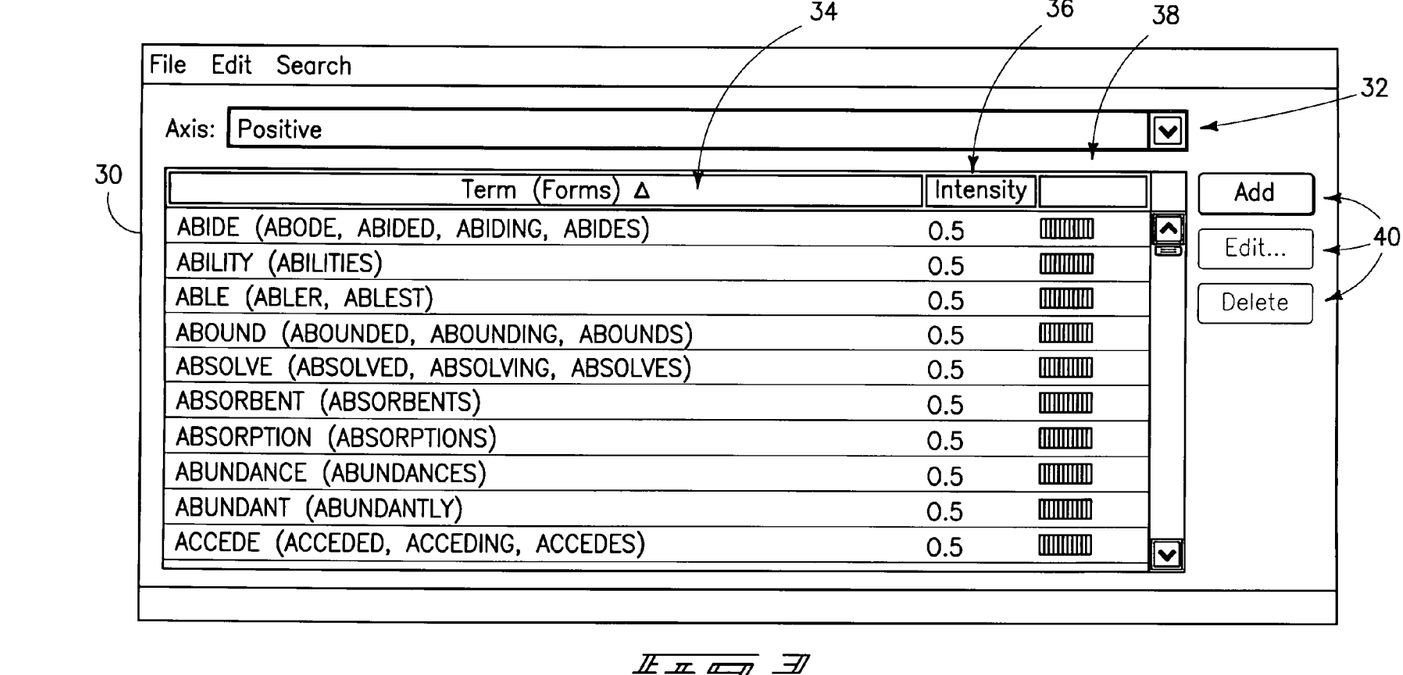
FIG. 3 is a window of a graphical user interface comprising a main view of a lexicon editor according to one embodiment.

Referring to FIG. 3, a window 30 of an exemplary main view of a lexicon editor depicted using display 18 is shown. The window is a graphical user interface which has a plurality of user interactive elements which may be accessed by a user to perform desired operations with respect to one or more sentiment lexicon. For example, processing circuitry 18 may access user input received via user interface 16 with respect to the user interactive element, process the user input, and implement an operation associated with the user interactive element.

In the example of FIG. 3, a user interactive element in the form of a drop down menu 32 may be accessed by a user to select a desired sentiment or axes (i.e., the "positive" axes has been selected in FIG. 3). The graphical user interface includes a term region 34 listing affect bearing terms of the selected lexicon. In addition, term region 34 lists alternate forms (if any) of the respective affect bearing terms in the depicted example.

The graphical user interface also includes an intensity (also referred to as a strength measure) region 36 which lists a plurality of respective intensity values corresponding to the respective content terms. The intensity values may be set to a default value (e.g., 0.5) and may be increased or decreased by a user via user interface 16 if desired. The intensity value may be used during sentiment analysis of text items to either increase or decrease the sentiment value of a text item including the respective content term. For example, if the intensity value is increased, the presence of the respective term in a text item will result in an increased sentiment score for the respective axes compared with the presence of a term having a default intensity value. Region 38 of the graphical user interface graphically indicates the intensity values of the content terms in the form of bars for quick viewing by a user and may be user interactive elements selectable by a user for adjustment of the weights.

A user may edit, delete or add terms or alternate forms with respect to a lexicon using the depicted exemplary graphical user interface. In the illustrated example, a plurality of user interactive elements in the form of buttons 40 may be accessed by a user to add new terms to the lexicon and edit or delete selected terms of the lexicon. If a user selects the add button 40, another window may appear wherein the user may type in the new term and any forms. In addition, a user may select one of the content terms with region 34 and select the edit button which allows the user to modify the content term or any forms thereof. A user may also select one of the terms with region 34 and select the delete button which allows the user to delete the term and any forms thereof from the lexicon.

Figure 4:
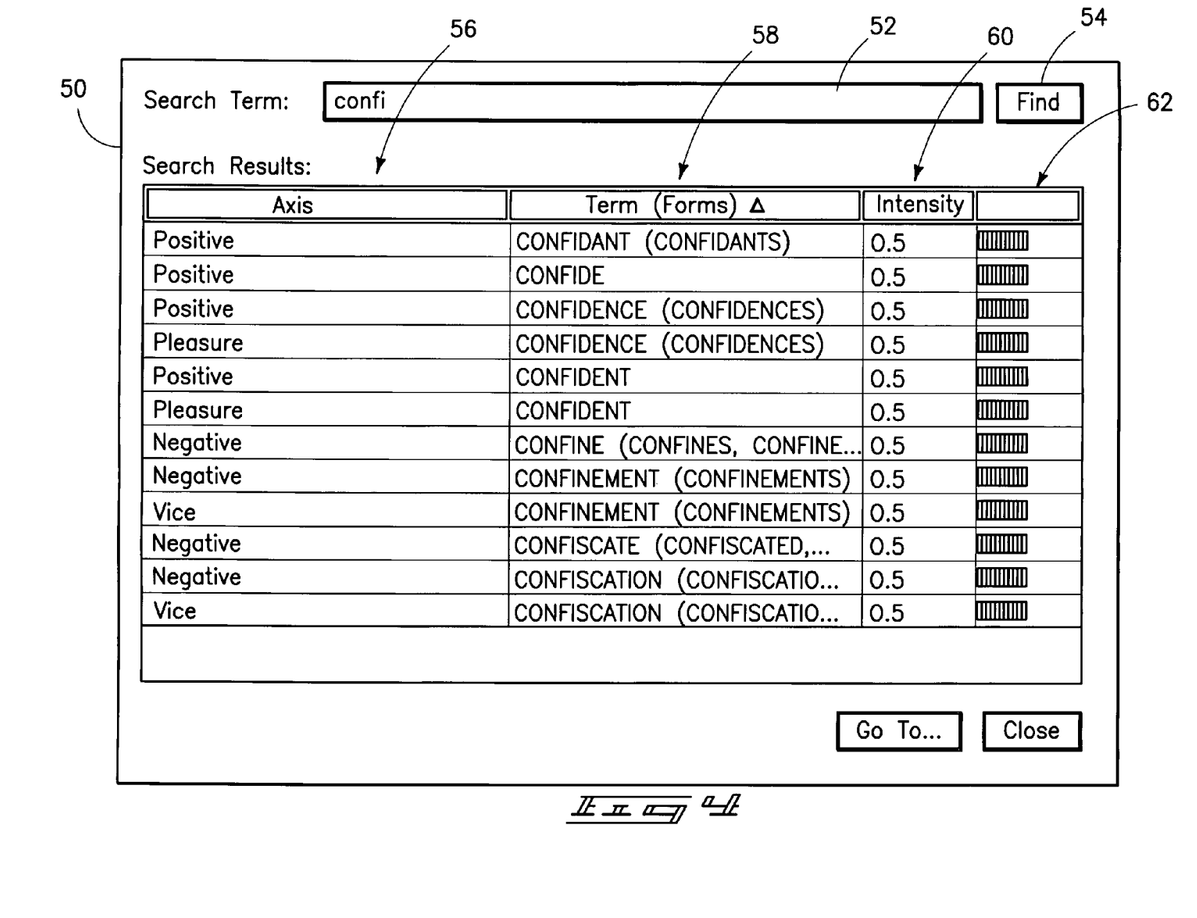
FIG. 4 is a window of a graphical user interface of a search tool according to one embodiment.

Referring to FIG. 4, a window 50 of a graphical user interface which may be used to search terms of one or more lexicon is shown. A user may type a desired term to be searched in region 52 and access a user interactive element in the form of button 54 to search the lexicon(s) for the respective term. In the illustrated example, the term is searched across all axes and the results are displayed. As shown in FIG. 4, a region 56 may depict the axes wherein the term appears, a region 58 includes the terms and forms located, and the regions 60, 62 depict the respective intensity scores as discussed above. In one embodiment, the search capability supports wild card searches and the results of searching for the string confi* are shown in the exemplary embodiment. If a term is found, a user can edit or delete that term by navigating back to the axis in which it was found. Alternatively, the user may edit or delete the term for all of the axes simultaneously.

Figure 5:
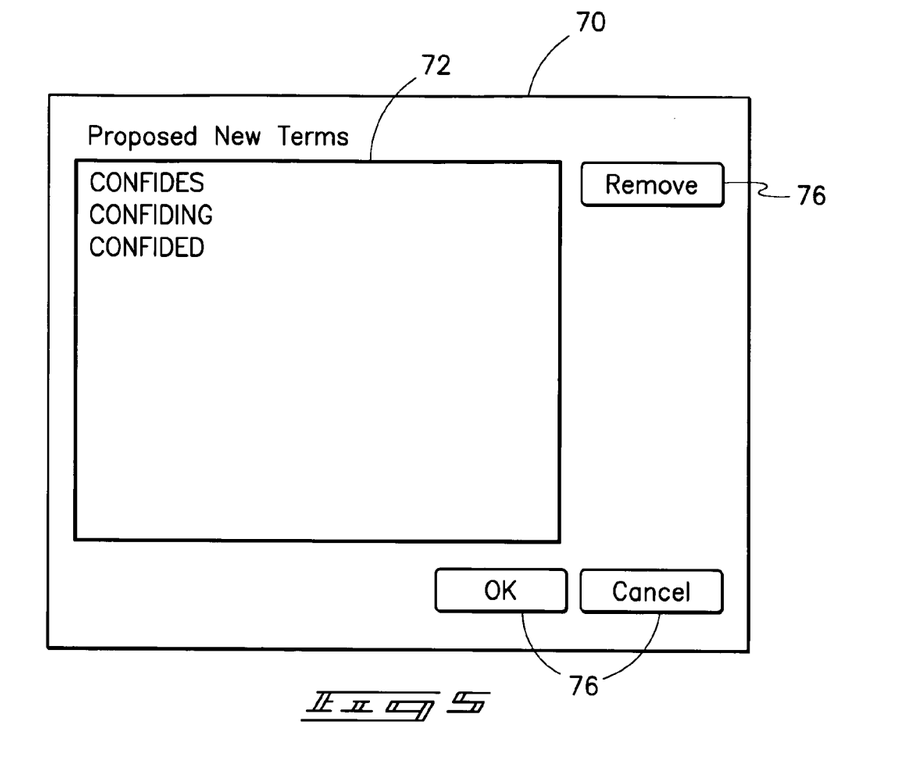
FIG. 5 is a window of a graphical user interface comprising a proposed term window according to one embodiment.
Figure 6:
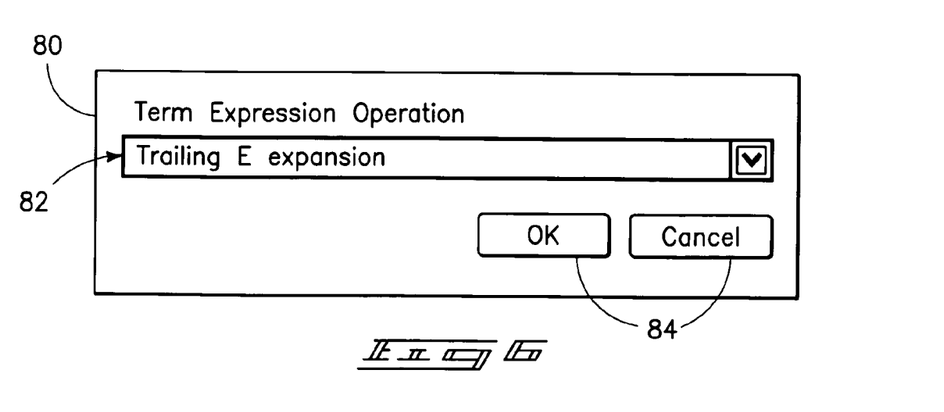
FIG. 6 is a window of a graphical user interface of a term expansion tool according to one embodiment.

Referring to FIG. 5, a window 70 of a graphical user interface depicted using display 18 for adding new terms to one or more lexicon according to one embodiment is shown. Window 70 includes a region 72 where proposed new terms to be added to lexicon(s) may be typed by a user. In addition, with respect to FIG. 6, automatic term expansion operations may be performed. In one embodiment, simple term expansion capabilities are added which let a user define (e.g., using regular expressions) operations to be performed on words to generate alternate word forms. For example, if a user typed in a term "confide" within region 72 of FIG. 5, a window 80 shown in FIG. 6 may be used to expand the term. Window 80 includes a user interactive element in the form of a drop down menu 82 in the depicted embodiment which may be accessed by a user to select the desired type of term expansion. User interactive elements in the form of buttons 84 may be selected by a user to implement or cancel the expansion. In the example of FIGS. 5 and 6, a user has selected trailing E expansion of "confide" which results in expansion of "confide" to "confides," "confiding," and "confided." A rule-based approach for morphological expansion may be used in one embodiment. User interactive elements in the form of buttons 76 of FIG. 5 may be used by a user to remove nonsensical terms, accept the new terms, or cancel the operation of adding proposed new terms.

Figure 7:
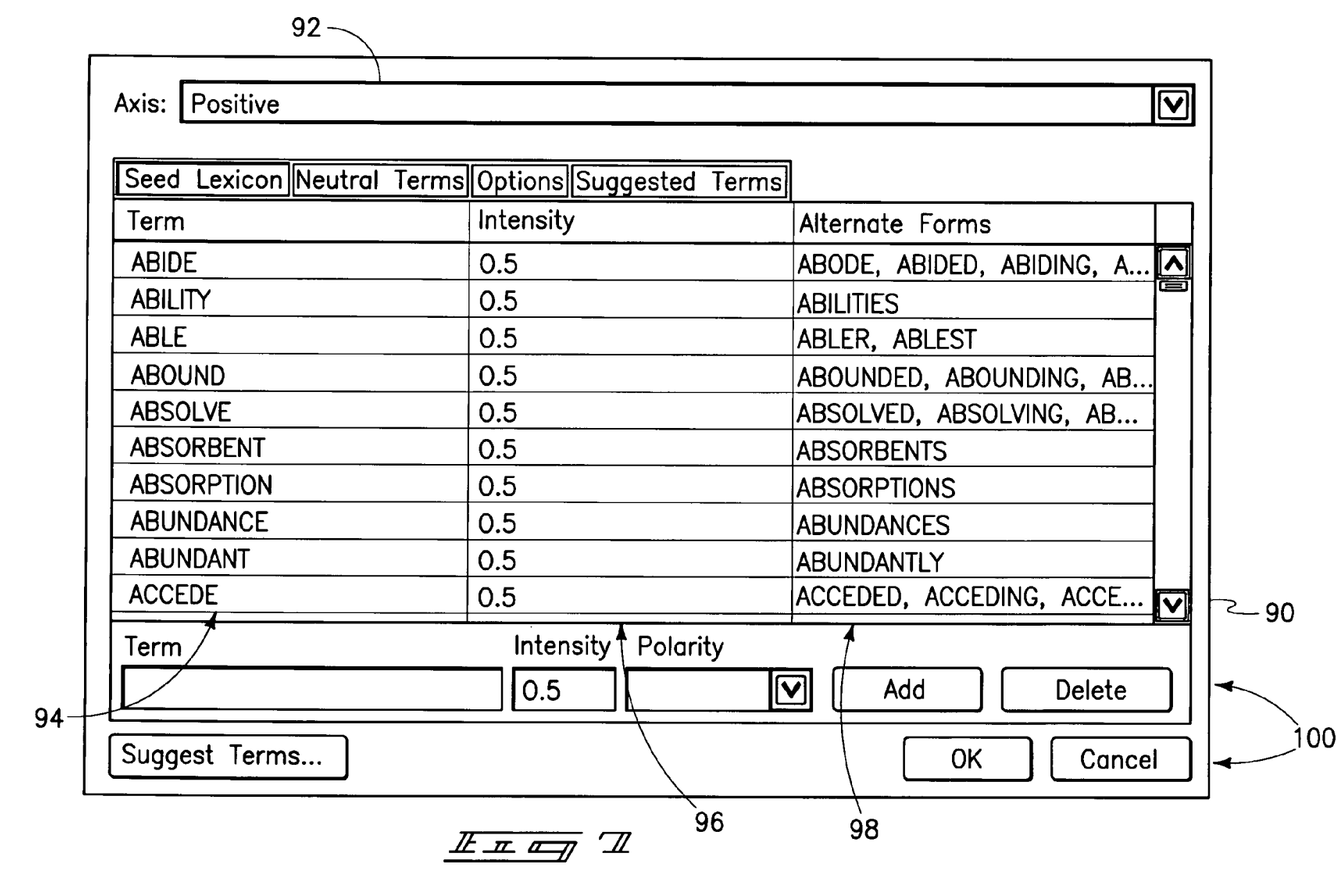
FIG. 7 is a window of a graphical user interface of a bootstrapping utility tool according to one embodiment.

Referring to FIG. 7, a window 90 of a graphical user interface depicted using display 18 and corresponding to an exemplary bootstrapping operation is shown. A user interactive element in the form of a drop down menu 92 may be accessed by a user to select a desired axis. Regions 94, 96, 98 of window 90 include terms, intensity values and alternative forms of terms, respectively. As discussed above, processing circuitry 12 may identify new terms to add to a lexicon using a corpus and a seed list corresponding to the sentiment of the lexicon being generated. User interactive elements in the form of buttons 100 may be used to add terms or delete found terms, and accept or cancel the overall bootstrapping operation in the exemplary depicted embodiment.

Figure 8:
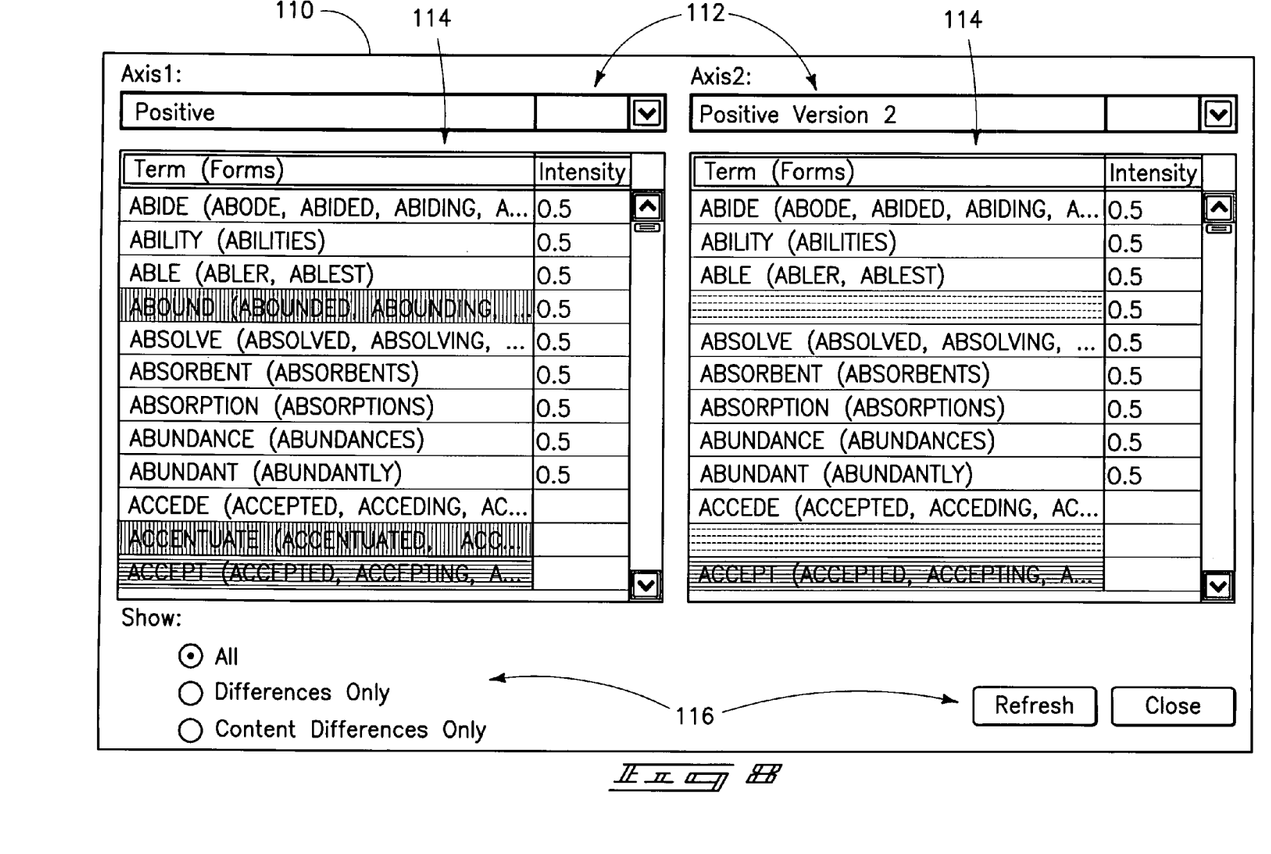
FIG. 8 is a window of a graphical user interface of a comparison tool according to one embodiment.

Referring to FIG. 8, a window 110 of a graphical user interface depicted using display 18 for comparing a plurality of sentiment axes according to one embodiment is shown. For example, some sentiment axes may have overlapping words (e.g., terms in the pleasure axis may also be in the positive axis). Window 110 provides a convenient way for a user to compare a plurality of lexicons of different axes, for example, to see differences between lexicons. As shown in FIG. 8, window 110 includes user interactive elements in the form of drop down menus 112 which permit the user to select the lexicons for comparison (i.e., plural versions of positive lexicons are compared in FIG. 8). The terms of the plural lexicons are displayed in respective regions 114 in the depicted example. Terms (e.g., Abound) in one axis that do not have a corresponding entry in the other axis may be indicated or otherwise distinguished such as being depicted in red. Terms (e.g., Accept) which overlap but differ in some way (e.g., form or intensity) may also be indicated or otherwise distinguished for example by being depicted in blue. User interactive elements in the form of buttons 116 enable a user to control how the information is displayed, refreshing of the information and closure of the window 110.

Figure 9:
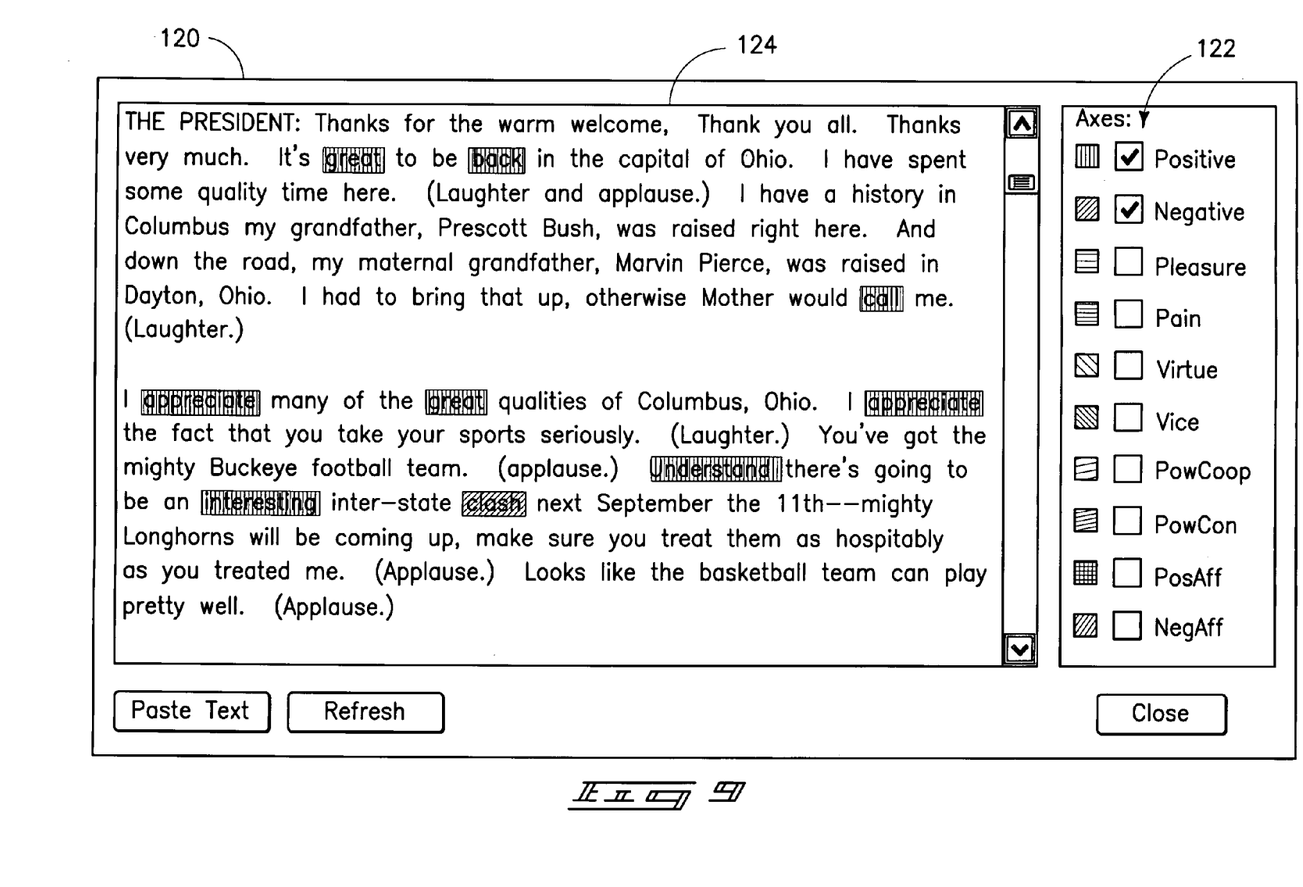
FIG. 9 is a window of a graphical user interface of a document viewer according to one embodiment.

Referring to FIG. 9, a window 120 of a graphical user interface depicted using display 18 illustrates a viewer for assisting a user with identifying affect bearing terms of one or more lexicon within a text item such as a document. Window 120 assists a user with observing what the effects of changes and different lexicons have on text items which are being analyzed for affect. In one embodiment, the affect bearing terms in a text item are indicated, for example, by different color coding according axes. A plurality of selectable boxes 122 corresponding to respective ones of the axes are shown. Using boxes 122, a user may select which lexicons are to be identified within a text item (e.g., only positive and negative axes are selected in the example of FIG. 9). Processing circuitry 12 operates to control the display of the content terms of a text item within a region 124 of window 120. In one example, a user may copy and paste text into region 124 and see which affect bearing words are present according to the selected lexicon(s). Processing circuitry 12 may search and locate the presence of affect bearing terms corresponding to the selected axes within the text. Affect bearing terms of the text item within region 124 and which correspond to the selected axes may be indicated to a user (e.g., highlighted according to respective colors of the axes associated with boxes 122 in the depicted example). Some terms may be highlighted in a color (e.g., grey) different than the colors associated with the axes if the terms are in more than one of the selected axes in one embodiment. A user may use window 120 to explore lexicons and check for desired additions or deletions in one implementation.

Computing device 10 operating as a lexicon generator or lexicon editor may be language independent in one embodiment. Computing device 10 may be configured to load, create and edit lexicons in other languages in one embodiment. During bootstrapping, the language of the terms of the seed list should correspond to the language of the corpus of text items being used in one embodiment. Also, one embodiment fosters creation of context-dependent affect lexica when the context is provided by the corpus from which the content terms augmenting the seed lexicon are drawn.

Once generated, lexicons may be used with an affect measurement tool, such as IN-SPIRE available from Pacific Northwest National Laboratory. The lexicons may be utilized to measure affective content of a corpus for one or more axes specified by a user. For example, text items of a corpus may be classified based on the presence and number of content terms from an affect lexicon that the text items contain. The exemplary bootstrapping aspects described above according to one embodiment improve affect classification of text items by increasing the size of the lexicon and may also allow construction of lexicons according to specific corpus and modification of lexicons using exemplary editing aspects described herein.

Some exemplary aspects discussed herein have advantages of being configured for use in implementations to accommodate specialized lexicons and to classify documents in a variety of domains for which training data may not be available. Some exemplary aspects permit end users to generate and modify lexicons based upon their respective data to be analyzed for sentiment. Some exemplary embodiments described herein provide a computationally efficient bootstrapping method and apparatus. In addition, at least some of the apparatus and methods may be used in contexts in which limited language processing resources such as WordNet, syntactic information, etc. are available.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A computer-implemented lexicon generation method comprising:
   accessing a seed list corresponding to one of a plurality of sentiment categories, wherein the seed list comprises a plurality of seed terms which are affect bearing terms corresponding to the one of the sentiment categories;
   accessing a plurality of text items;
   providing a seed vector comprising a plurality of values for respective ones of the text items, and wherein the values individually correspond to a number of occurrences of all of the seed terms of the seed list in a respective one of the text items;
   providing a plurality of content vectors for respective ones of a plurality of content terms, wherein an individual one of the content vectors comprises a plurality of values for respective ones of the text items, and wherein the values of one of the content vectors individually correspond to a number of occurrences of the respective content term of the one of the content vectors in a respective one of the text items;
   comparing individual ones of the content vectors with respect to the seed vector; and
   using the comparing, selecting at least one of the content terms as a term of a lexicon in sentiment analysis of text.

2. The method of claim 1 wherein the comparing indicates relatedness of individual ones of the content vectors with respect to the seed vector.

3. The method of claim 1 wherein the selecting comprises selecting the at least one of the content terms having an affect associated with the seed terms of the seed list.

4. The method of claim 1 wherein the comparing comprises comparing using a L1 distribution density measure.

5. The method of claim 1 wherein the comparing provides a plurality of similarity measures comprising the similarities of respective ones of the content vectors with respect to the seed vector, and wherein the selecting comprises selecting the at least one of the content terms as a result of the at least one of the content terms having the greatest similarity to a sentiment of the seed terms.

6. The method of claim 1 wherein the selecting comprises selecting the at least one content term as the term of the lexicon which comprises affect bearing terms which are configured to provide information regarding sentiment of text.

7. The method of claim 1 wherein the selecting comprises selecting the at least one content term as an affect bearing term configured to provide information regarding sentiment of text.

8. The method of claim 1 wherein the selecting comprises selecting as a result of a user input.

9. The method of claim 1 further comprising including the selected at least one of the content terms in the lexicon.

10. The method of claim 1 wherein the seed terms comprising affect bearing terms individually indicate sentiment of text.

11. The method of claim 1 wherein the providing the content vectors comprises providing the content vectors for respective ones of the content terms which comprise terms present in the text items.

12. A lexicon generation device comprising:
    processing circuitry configured to:
    access a seed list corresponding to one of a plurality of sentiment categories, wherein the seed list comprises a plurality of seed terms which are affect bearing terms corresponding to the one of the sentiment categories;
    access a plurality of text items;
    provide a seed vector comprising a plurality of values for respective ones of the text items, and wherein the values individually correspond to a number of occurrences of all of the seed terms of the seed list in a respective one of the text items;
    provide a plurality of content vectors for respective ones of a plurality of content terms, wherein an individual one of the content vectors comprises a plurality of values for respective ones of the text items, and wherein the values of one of the content vectors individually correspond to a number of occurrences of the respective content term of the one of the content vectors in a respective one of the text items;
    compare individual ones of the content vectors with respect to the seed vector; and
    using the comparison, select at least one of the content terms as a term of a lexicon in sentiment analysis of text.

13. The device of claim 12 wherein the comparison indicates relatedness of individual ones of the content vectors with respect to the seed vector.

14. The device of claim 12 wherein the processing circuitry is configured to select the at least one of the content terms having an affect associated with the seed terms of the seed list.

15. The device of claim 12 wherein the processing circuitry is configured to implement the comparison using a L1 distribution density measure.

16. The device of claim 12 wherein the processing circuitry is configured to implement the comparison to provide a plurality of similarity measures comprising the similarities of respective ones of the content vectors with respect to the seed vector, and wherein the processing circuitry is configured to select the at least one of the content terms as a result of the at least one of the content terms having the greatest similarity to a sentiment of the seed terms.

17. The device of claim 12 wherein the processing circuitry is configured to select the at least one content term as the term of the lexicon which comprises affect bearing terms which are configured to provide information regarding sentiment of text.

18. The device of claim 12 wherein the processing circuitry is configured to select the at least one content term as an affect bearing term configured to provide information regarding sentiment of text.

19. The device of claim 12 wherein the processing circuitry is configured to select the at least one content term as the term of the lexicon as a result of a user input.

20. The device of claim 12 wherein the processing circuitry is configured to include the selected at least one of the content terms in the lexicon.

21. The device of claim 12 wherein the seed terms comprising affect bearing terms individually indicate sentiment of text.

22. The device of claim 12 wherein the processing circuitry is configured to provide the content vectors for respective ones of the content terms which comprise terms present in the text items.

23. An article of manufacture comprising:
    a computer-readable storage medium comprising programming configured to cause processing circuitry to perform processing comprising:
    accessing a seed list corresponding to one of a plurality of sentiment categories, wherein the seed list comprises a plurality of seed terms which are affect bearing terms corresponding to the one of the sentiment categories;

accessing a plurality of text items;

providing a seed vector comprising a plurality of values for respective ones of the text items, and wherein the values individually correspond to a number of occurrences of all of the seed terms of the seed list in a respective one of the text items;

providing a plurality of content vectors for respective ones of a plurality of content terms, wherein an individual one of the content vectors comprises a plurality of values for respective ones of the text items, and wherein the values of one of the content vectors individually correspond to a number of occurrences of the respective content term of the one of the content vectors in a respective one of the text items;

comparing individual ones of the content vectors with respect to the seed vector; and using the comparing, selecting at least one of the content terms as a term of a lexicon in sentiment analysis of text.

24. The article of claim 23 wherein the comparing indicates relatedness of individual ones of the content vectors with respect to the seed vector.

25. The article of claim 23 wherein the selecting comprises selecting the at least one of the content terms having an affect associated with the seed terms of the seed list.

26. The article of claim 23 wherein the comparing comprises comparing using a L1 distribution density measure.

27. The article of claim 23 wherein the comparing provides a plurality of similarity measures comprising the similarities of respective ones of the content vectors with respect to the seed vector, and wherein the selecting comprises selecting the at least one of the content terms as a result of the at least one of the content terms having the greatest similarity to a sentiment of the seed terms.

28. The article of claim 23 wherein the selecting comprises selecting the at least one content term as the term of the lexicon which comprises affect bearing terms which are configured to provide information regarding sentiment of text.

29. The article of claim 23 wherein the selecting comprises selecting the at least one content term as an affect bearing term configured to provide information regarding sentiment of text.

30. The article of claim 23 wherein the selecting comprises selecting as a result of a user input.

31. The article of claim 23 further comprising including the selected at least one of the content terms in the lexicon.

32. The article of claim 23 wherein the seed terms comprising affect bearing terms individually indicate sentiment of text.

33. The article of claim 23 wherein the providing the content vectors comprises providing the content vectors for respective ones of the content terms which comprise terms present in the text items.

* * * * *